US008374436B2

(12) United States Patent
Chamaret et al.

(10) Patent No.: US 8,374,436 B2
(45) Date of Patent: Feb. 12, 2013

(54) METHOD FOR DETECTING LAYOUT AREAS IN A VIDEO IMAGE AND METHOD FOR GENERATING AN IMAGE OF REDUCED SIZE USING THE DETECTION METHOD

(75) Inventors: Christel Chamaret, Chantepie (FR); Olivier Le Meur, Talensac (FR); Jean-Claude Chevet, Betton (FR)

(73) Assignee: Thomson Licensing, Issy-les-Moulineaux (FR)

( * ) Notice: Subject to any disclaimer, the term of this patent is extended or adjusted under 35 U.S.C. 154(b) by 900 days.

(21) Appl. No.: 12/455,972

(22) Filed: Jun. 10, 2009

(65) Prior Publication Data

US 2009/0324088 A1 Dec. 31, 2009

(30) Foreign Application Priority Data

Jun. 30, 2008 (EP) ........................ 0854409

(51) Int. Cl.
*G06K 9/00* (2006.01)
*G06K 9/46* (2006.01)
(52) U.S. Cl. .................. 382/195; 382/103; 382/107
(58) Field of Classification Search .................. 382/103, 382/107, 181, 190, 195, 282; 348/154, 155
See application file for complete search history.

(56) References Cited

U.S. PATENT DOCUMENTS

| 7,102,667 | B2 * | 9/2006 | Ferguson | 348/180 |
| 7,346,212 | B2 * | 3/2008 | Cheatle | 382/173 |
| 7,576,755 | B2 * | 8/2009 | Sun et al. | 345/629 |
| 8,036,485 | B2 * | 10/2011 | Ferguson et al. | 382/266 |
| 2002/0090133 | A1 * | 7/2002 | Kim et al. | 382/164 |
| 2002/0164074 | A1 * | 11/2002 | Matsugu et al. | 382/173 |
| 2003/0142210 | A1 * | 7/2003 | Carlbom et al. | 348/157 |
| 2004/0088726 | A1 * | 5/2004 | Ma et al. | 725/46 |
| 2006/0070026 | A1 * | 3/2006 | Balinsky et al. | 717/106 |

(Continued)

FOREIGN PATENT DOCUMENTS

| EP | 193566 A1 * | 12/2006 |
| EP | 1936566 A1 | 6/2008 |

(Continued)

OTHER PUBLICATIONS

Hugli et al. "Adaptive Visual Attention Model" Proceedings of Image and Vision Computing New Zealand (2007) p. 1-5 (233-237).*

(Continued)

*Primary Examiner* — David Zarka
*Assistant Examiner* — Mia M Thomas
(74) *Attorney, Agent, or Firm* — Myers Wolin, LLC

(57) ABSTRACT

The invention relates to an automatic detection method in a source image, of at least one area called a layout area comprising at least one layout, such as a logo and/or a score. According to the invention, the layout areas of a source image are detected using the salience of source image pixels. The detection is carried out in specific areas of the source image saliency map, usually in the areas corresponding to the corners of the image or to the bands in the upper part and lower part of the image. In these areas, two points are sought having maximum salience values and distant by at least p points from each other. These two points corresponding to the beginning and end of a layout area. The window bounding these two points then corresponds to a layout area.

10 Claims, 3 Drawing Sheets

U.S. PATENT DOCUMENTS

| | | | |
|---|---|---|---|
| 2006/0155684 A1* | 7/2006 | Liu et al. | 707/3 |
| 2006/0182339 A1* | 8/2006 | Connell | 382/170 |
| 2007/0047840 A1* | 3/2007 | Xu et al. | 382/294 |
| 2007/0116361 A1* | 5/2007 | Le Meur et al. | 382/181 |
| 2008/0193048 A1* | 8/2008 | Sun et al. | 382/284 |
| 2008/0201282 A1* | 8/2008 | Garcia et al. | 706/20 |
| 2008/0266398 A1* | 10/2008 | Ferguson | 348/181 |
| 2008/0266427 A1* | 10/2008 | Ferguson et al. | 348/246 |
| 2008/0267442 A1* | 10/2008 | Ferguson | 382/100 |
| 2008/0304708 A1* | 12/2008 | Le Meur et al. | 382/107 |
| 2008/0304742 A1* | 12/2008 | Connell | 382/170 |
| 2010/0305755 A1* | 12/2010 | Heracles | 700/253 |

FOREIGN PATENT DOCUMENTS

| | | |
|---|---|---|
| WO | WO 2006/072896 | 7/2006 |

OTHER PUBLICATIONS

Le Meur et al. "Predicting visual fixations on video based on low-level visual features" Vision Research, Pergamon Press, Oxford, GB. vol. 47 No. 19, Sep. 1, 2007 p. 2483-298 XP022237937 ISSN: 0042-6989.

Zyga K J et al. "Logo recognition using retinal coding" Signals, Systems and Computers, 2004. Conference Record of the Thirty-Eight Asilomar Conference on Pacific Grove, CA., SA Nov. 7-10, 2004 (Jan. 7, 2004), pp. 1549-1553, xp010781243 ISBN: 978-0/7803-8622-8 *le document en entier *.

Itti L et al. : "A Principled Approach to Detecting Surprising Events in Video" 2005 IEEE Computer Society Conference on, IEEE, Piscataway, NJ, USA vol. 1, Jun. 20, 2005, pp. 631-637, xp010817332 isbn: 978-0/7695-2372-9 *lle document en entier*.

* cited by examiner

METHOD FOR DETECTING LAYOUT AREAS IN A VIDEO IMAGE AND METHOD FOR GENERATING AN IMAGE OF REDUCED SIZE USING THE DETECTION METHOD

This application claims the benefit, under 35 U.S.C. §119, of European Patent Application No. 0854409 filed 30 Jun. 2008.

DOMAIN OF THE INVENTION

This invention relates to the detection of layout areas, such as logos and/or scores, in a video image and the generation of a reduced size image from a source image.

TECHNOLOGICAL BACKGROUND OF THE INVENTION

Several detection techniques of layout areas in video images are known. A first technique is described in the document "Automatic logo removal using statistical based logo detection and frequency selective inpainting" by K. Meisinger, T. Troeger, M. Zeller and A. Kaup, Proc. European Signal Processing Conference, September 2005. This technique involves detecting the image areas that do not change in the image sequence, the starting hypothesis being that the content of images generally changes over time with the exception of image areas that contain layouts. The algorithm used to detect layouts is based on an image to image difference and the pixels for which the difference from one image to another is zero or close to zero are considered to form part of the layout. A first problem with this technique is that it is not adapted for scenes which contain little or no motion. A second problem is that it requires the analysis of several consecutive images for implementation.

A second known technique is described in the document "Real-time opaque and semi-transparent TV logos detection" by A. Reis dos Santos and H. Yong Kim, Proc. 5$^{th}$ International Information and Telecommunication Technologies Symposium, 2006. In this document, layout detection is based on the detection of contours which requires pre-processing on several consecutive images.

Finally a third known technique consists in comparing visual content in the image to be processed with a predefined layout base. The visual content of image areas is compared with the visual content of each of the layouts contained in the base. A layout is detected when the visual content is identical to the visual content of the area tested. This technique only detects layouts contained in the base and thus involves prior knowledge of logos to be detected.

SUMMARY OF THE INVENTION

The purpose of the present invention is to propose a solution to overcome all or some of the disadvantages previously cited.

According to the invention, the detection of layout in a source image is carried out from a saliency map of said source image said saliency map being generated from a visual attention model.

For this purpose, the present invention proposes a method for automatic detection in a source image of at least one area referred to as a layout area comprising at least one layout, such as a logo and/or a score, comprising the following steps:
generating a saliency map of said source image using a visual attention model, said saliency map associating with each pixel of the source image a salience point having a salience value, and
determining, from said saliency map, said at least one layout area in the source image.

The detection is thus carried out from a single source image and does not require prior knowledge of the layouts to be detected.

According to a particular characteristic of the invention, the step of determining a layout area in a source image comprises the following steps:
a) searching within at least one predefined area of the saliency map referred to as the search area, two points having the same or nearly the same maximum salience value of said saliency map and distant by at least p points, and defining for each of these two points of maximum salience, an area, referred to as maximal salience, bounding the point of maximum salience and
b) defining for each search area comprising two maximum salience areas, a window, referred to as the bounding window, bounding said two maximum salience areas, each bounding window thus defined in the saliency map corresponding to a layout area in the source video image.

The layouts being generally located in the areas in the corner of source images, according to a specific first embodiment, the search area comprises at least one area of predefined size in the saliency map corresponding to a source image area in a corner of the source image.

Preferably, said at least one search area comprises m areas of predefined size of the saliency map each corresponding to a area of the source image located in a corner of the source image, m being comprised between 2 and 4.

According to a second specific embodiment, step a) of the method comprises the following steps:
searching in n predefined search areas of the saliency map, q points having a saliency value equal to or nearly equal to the maximum salience value of said saliency map and at a distance of at least p points from each other, and defining for each of the q maximum salience points, an area of maximum salience bounding the maximum salience point, n being greater than or equal to 2 and q being greater than n+1, and
choosing, among the q maximum salience areas, two maximum salience areas verifying at least one predefined criterion.

In the case where n is equal to 2, the two search areas are advantageously the areas of the saliency map corresponding to two bands of predefined width of the upper and lower parts of the source image and at least three maximum salience points are searched for in these two search areas.

In this second embodiment, the two maximum salience areas selected verifying at least one of the following criteria:
that the height of the smallest rectangle containing the two maximum salience areas is less than a maximum height;
that the surface area of the smallest rectangle containing the two maximum salience areas is less than a maximum surface area;
that the distance between the centre of the saliency map and each of the two maximum salience areas is greater than a minimum distance.

Moreover, the maximum salience area defined for a maximum salience point is advantageously a circle, of a predefined radius, centered on said maximum salience point.

The invention also relates to a method for processing a source image, able to generate a reduced size image from said source image, comprising the following steps:
automatic detection of layout areas according to the automatic layout detection method previously defined, and generation of an image of reduced size from said source image being based on the saliency map generated for the automatic detection of the layout area, and on the detected layout area.

According to a specific embodiment, the points contained in the bounding window(s) determined by the automatic layout detection method are set to zero in the saliency map used to generate the reduced size image. Thus, the source image layout areas, which are not areas of interest for the viewer, do not interfere with the determination the reduced image.

According to another specific embodiment that can be combined with the preceding embodiment, the reduced size image is generated in such a way that it does not contain pixels corresponding to points contained in the bounding window(s) determined by the layout area automatic detection method.

BRIEF DESCRIPTION OF THE DRAWINGS

The invention will be better understood and other aims, details, features and advantages will appear more clearly upon reading the detailed explanatory description that follows of two specific embodiments of the invention currently preferred, made in reference to the annexed drawings, among which.

DETAILED DESCRIPTION OF EMBODIMENTS OF THE INVENTION

According to the invention, the source image layout areas are determined from the saliency map of this image. A layout is detected when two maximum salience areas are detected in a same region of the saliency map, the first maximum salience area corresponding to the start of the layout and the second maximum salience area corresponding to the end of the layout.

In the rest of the description, a layout designates any information added or embedded into the source image such as a logo, information on duration or time, a score in the case of images relating to a sports event.

Figure 1:
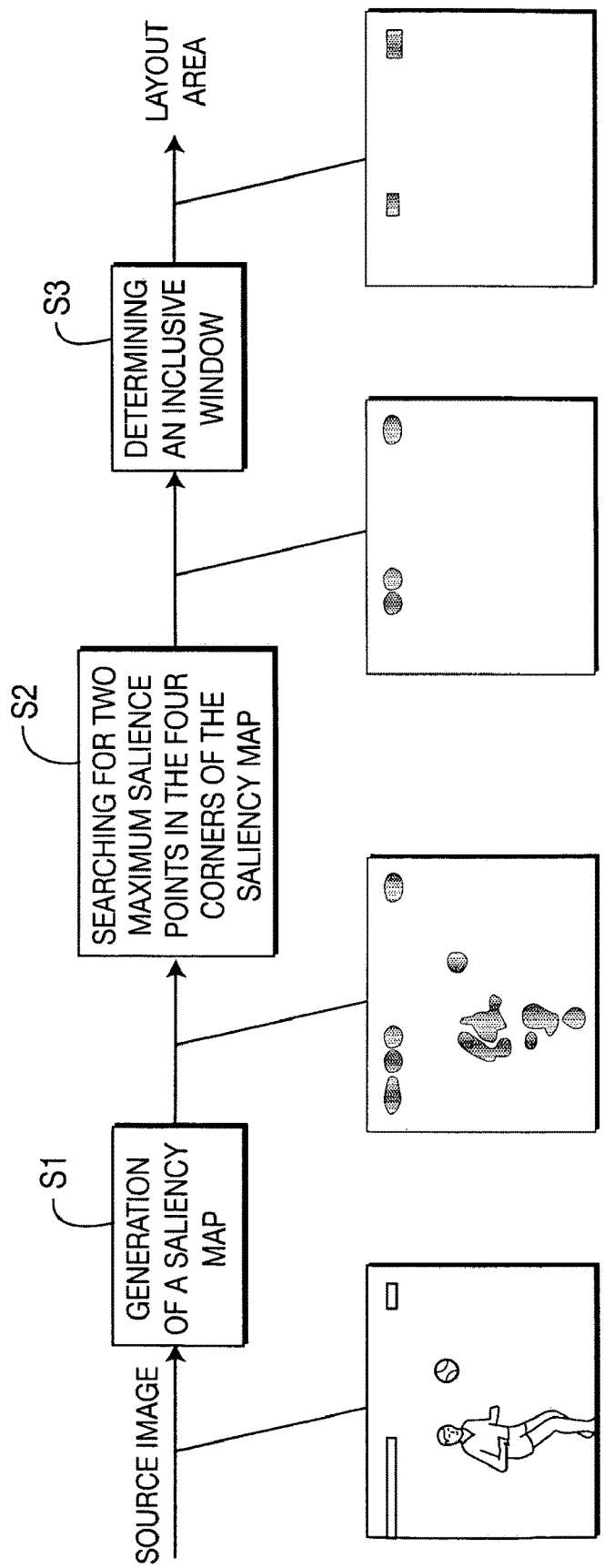
FIG. 1 shows the detection method according to a first embodiment of the invention.

FIG. 1 shows the steps from the first embodiment according to the invention. The source image to be processed is an image taken from a football match. It shows a football player next to a football. The match score is displayed in the upper left-hand side of the image and an AF1 logo identifying the television channel retransmitting the football match is displayed in the upper right-hand side.

At a step S1, a saliency map of the source image is generated using a visual attention model. The generation of a saliency map is described in the European patent EP 1 685 288. This saliency map associates with each pixel of the source image a salience value which is a function of the perceptual interest of the image pixel. The higher the perceptual interest of the image pixel, the higher the salience value. Salience values are for example normalized and comprised between 0 and 255. The salience value is represented in the saliency map by a point having the same spatial coordinates as the source image pixel that it characterizes and a level of grey proportional to the salience value of the pixel. The lightest points on the saliency map representing the most salient points of the source image. They correspond to areas of strong contrast in the image. In the example in FIG. 1, the lightest points are found in the image areas representing the player, the ball, the match score and the logo.

In the following step S2, are sought, in at least one predefined area of the saliency map called the search area, two points having a salience value equal to or almost equal to the maximum salience value of the saliency map and distant by at least p. These two points are called maximum salience points in the remainder of the description. If the search is performed in several search areas, two maximum salience points are searched for in each of these areas. In a saliency map with normalized values between 0 and 255, two points are searched for at a distance of at least p points, and having a salience value equal to 255, or, failing this, close to 255, preferably comprised between 250 and 255. These two points must be distant by at least p points to ensure that they do not both correspond to the beginning or end of a same layout area. The number p may vary according to the size of the source image. It is for example at 25 in the case of a 360×240 pixels image or a 352×288 pixels image.

In this embodiment, the search areas are advantageously areas of predefined size of the saliency map corresponding to areas located in the corners of the source image, areas in which a layout is likely to be present. In the example of FIG. 1, the search areas are areas of the saliency map corresponding to two rectangular areas located respectively in the left-hand and right-hand corners of the source image. Advantageously, the search is carried out in the areas of the saliency map corresponding to the four corners of the source image.

In each search area, the search is for example carried out by scanning the area, from left to right and from top to bottom. The search area is scanned a first time to ascertain the maximum salience value of this area. This value must be equal to or close to 255 to correspond to the start or end of the layout area. It is preferably greater than 250. In the absence of such a value, no layout area will be detected in this search area and, if necessary, the next search area should then be considered. If a salience value close to 255 is found, a second scan is then carried out to search for the point or points of the search area having a maximum salience value. Each time such a point is detected, it is selected and the points around the selected points are inhibited. The points belonging to the circle of radius R centered on the selected point are inhibited for example R being equal to p points. The scanning continues ignoring the inhibited points and selecting in the same way, the other points of the saliency map having the maximum salience value. If two points were not selected following this scan, the maximum salience value is decremented and further scans are carried out until two maximum salience points are selected. Scans are discontinued if, after a decrementation the maximum salience value becomes less than 250. If two points have not been selected, the following search area is then considered.

A maximum salience area is then defined around each of the two selected points. Advantageously, for a selected point, this area corresponds to the inhibited area previously defined, that is to say a circle of radius R centered on the selected point. The salience values of the points located outside of the defined maximum salience areas are set to zero.

For each search area up to two maximum salience areas are obtained. In the example of FIG. 1, two maximum salience areas were detected in each of the two search areas located in the two upper corners of the source image.

In the following step, S3, a window bounding the two maximum salience areas is defined in each search area comprising two maximum salience areas. If x and y designate horizontal and vertical axes respectively in the saliency map, this window is preferably the smallest rectangle having two sides parallel to the x axis and two sides parallel to the y axis and bounding the two areas selected. The source image pixels, for which corresponding points in the saliency map belong to this bounding window, are thus considered according to the invention, as belonging to a layout area in the source image.

Figure 2:
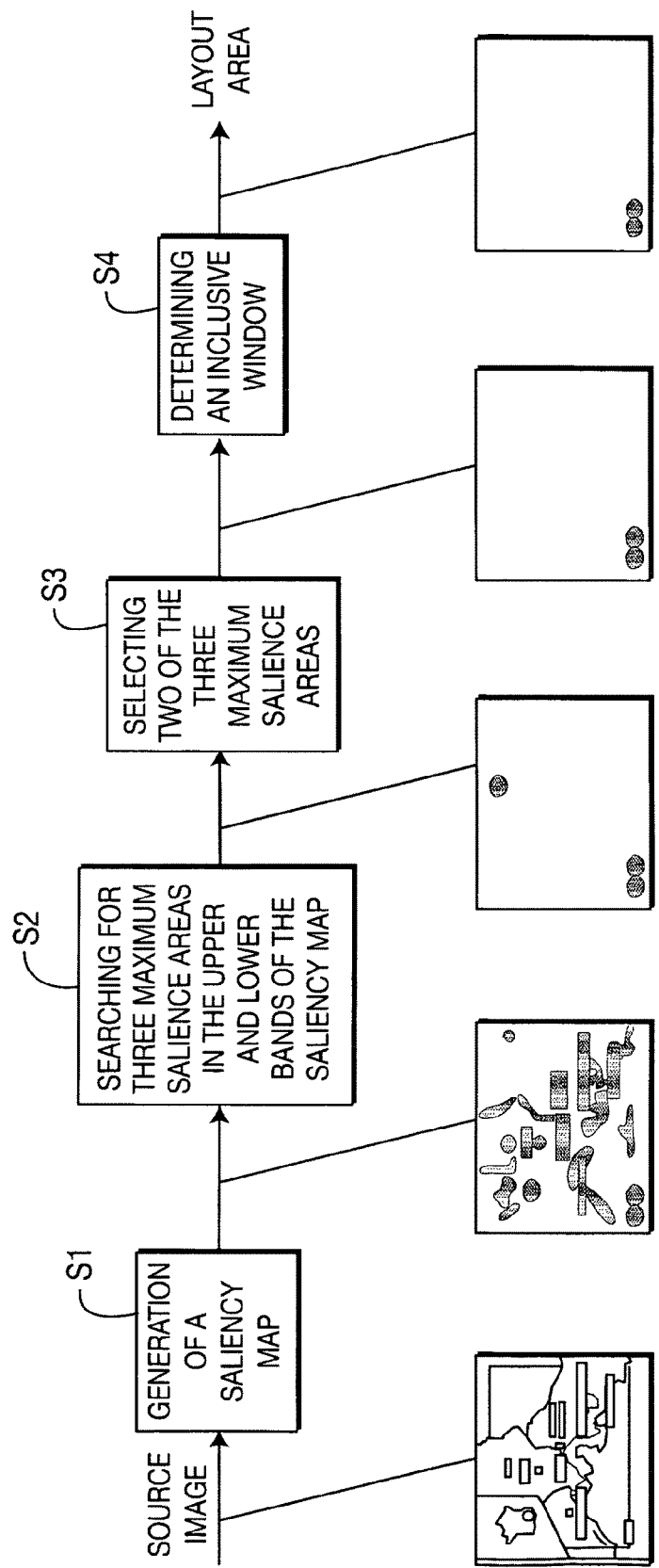
FIG. 2 shows the detection method according to a second embodiment of the invention; and, FIG. 3 shows the criteria used in step S'3 of the second embodiment to retain only two of the three maximum salience areas defined in step S'2.

FIG. 2 shows the steps of the second embodiment according to the invention. The source image to be processed is a geographical map of the South of France. There is an AF1 logo of the broadcasting television channel in the bottom left-hand corner of the image. At a step S'1, a saliency map of the image is generated using a visual attention model as described in step S1 of the first embodiment. In the example of FIG. 2, the most salient points of the saliency map are the areas corresponding to the logo, to the text contained within the image and to the borders between the different color zones of the geographical map.

In the following step S2', three maximum salience areas are searched for in two predefined search areas of the saliency map. In the example shown in FIG. 2, the search is carried out in two bands of predefined width from the saliency map, one located in the upper part of the saliency map and the other in the lower part. As indicated for step S2 of the first embodiment, this search is, for example, carried out by scanning the two bands of the saliency map, from left to right and top to bottom. The two bands are first scanned to obtain the maximum salience value of the two bands. This value must be equal to 255 or if not, close to 255, for example comprised between 250 and 255. In the absence of such a value, no layout area will be detected. If a salience value close to 255 is found, the two bands are then scanned for a second time to search for the point or points having a maximum salience value. Each time such a point is detected, it is selected and the points around the selected points are inhibited. For example, the points belonging to the circle of radius R centered on the selected point are inhibited. The scanning of the two bands continues ignoring the inhibited points and, if present two other points on the saliency map having the maximum salience value are selected. If three points are not selected following this scan, the maximum salience value is decremented and other scans are carried out until the selection of three maximum salience points is obtained.

A maximum salience area is then defined around each of the three selected points. Advantageously for a selected point, this area corresponds to the previously defined inhibited area, that is to say to the circle of radius R centered on the selected point. The salience values of the points located outside of the defined maximum salience areas are set to zero.

In the example of FIG. 2, one of the maximum salience areas is located in the upper band of the saliency map and the two other maximum salience areas are located in the lower band of the map.

In the following step, S'3, one of the three maximum salience areas is eliminated. The purpose of this step is to conserve the two maximum salience areas likely to coincide with the beginning and end of a layout, the third area is generally a false alarm. For this step, the three maximum salience points are classed from the most salient to the least salient. A first pair of points formed by the two most salient points is then tested verifying if this pair fulfils one or more predefined criteria. If this pair fulfils these criteria, the maximum salience areas corresponding to these two points are conserved and the maximum salience area corresponding to the least salient point is eliminated. Otherwise, a second pair made up of the most salient and the least salient of the three points is tested, then, if necessary, a third pair made up of the two least salient points is tested.

Figure 3:
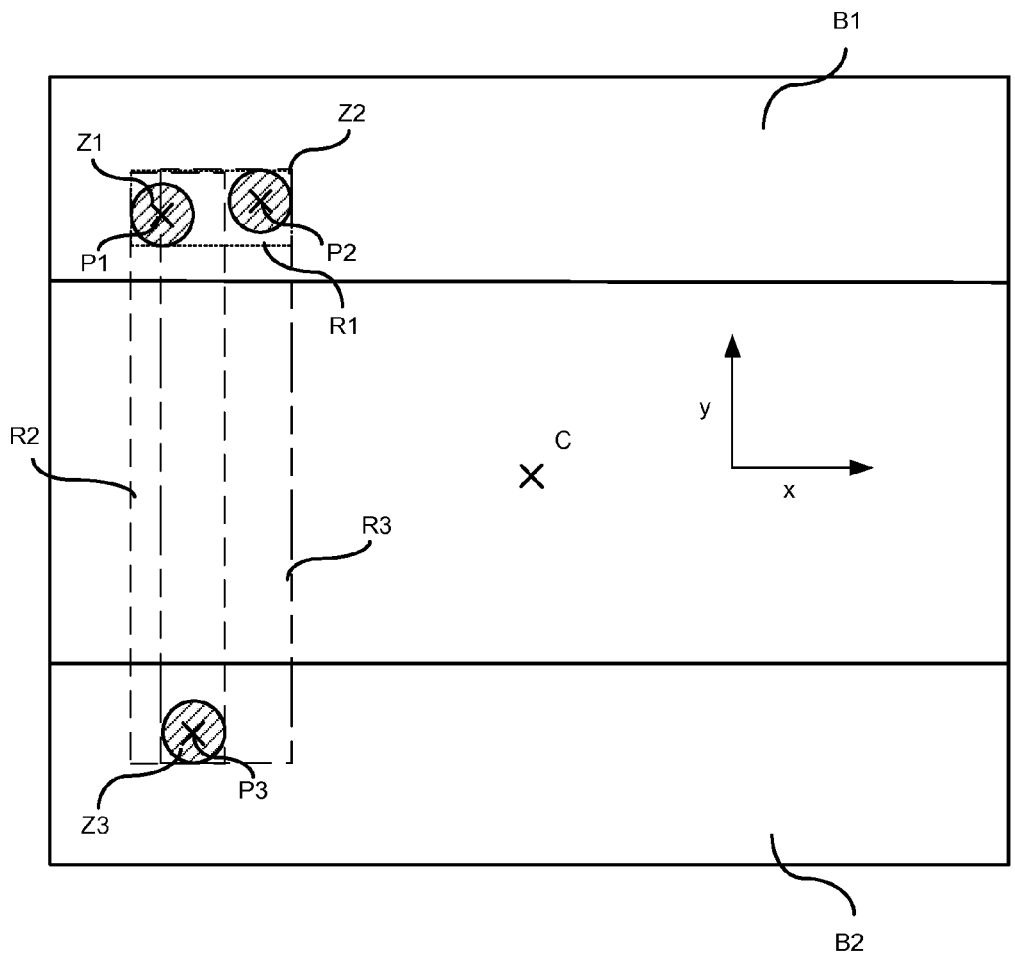

Criteria for eliminating one of the three maximum salience areas are shown in FIG. 3. This figure shows a saliency map in which three maximum salience points P1, P2 and P3 have been identified. The maximum salience areas of radius R relating to these three points are labeled as Z1, Z2 and Z3. Points P1 and P2 are present in a band B1 in the upper part of the saliency map and point P3 is present in a band B2 in the lower part of the saliency map. Bands B1 and B2 represent search areas. In this figure, R1 designates the smallest rectangle having two sides parallel to the x axis and two parallel to the y axis and bounding areas Z1 and Z2. R2 designates the smallest rectangle having two sides parallel to the x axis and two sides parallel to the y axis and bounding areas Z1 and Z3 and R3 designates the smallest rectangle having two sides parallel to the x axis and two sides parallel to the y axis and bounding areas Z2 and Z3. Finally C designates the centre of the saliency map which corresponds to the centre of the source image.

A first criterion is satisfied by a pair of points when the height (dimension according to the y axis) of the rectangle bounding the two maximum salience areas of the points of the pair under consideration is less than a predefined maximum height. This criterion ensures a guarantee that these two maximum salience areas come from the same upper or lower saliency map band. This criterion is always satisfied by the maximum salience areas representing the beginning and end of a layout.

A second criterion is satisfied by a pair of points when the surface area of the rectangle bounding the two maximum salience areas of the points of the pair under consideration is less than a predefined maximum surface area. This criterion enables a guarantee that the two points under consideration are noticeably aligned vertically or horizontally.

A third criterion is satisfied by a pair of points when, for each point of the pair, the distance between this point and the centre C of the saliency map is greater than a minimum distance.

According to the invention, the question of whether the three point pairs fulfill the first criterion is verified. Pairs that do not fulfill this first criterion are eliminated. If one pair fulfils this first criterion, it is selected. Otherwise, the pairs that were not eliminated are tested to see if they fulfill the second criterion. If one pair fulfils this second criterion, it is selected. Pairs that do not fulfill these first two criteria are eliminated. Finally if several pairs remain, those that are not eliminated are checked to see if they satisfy the third criterion. If one pair fulfils this third criterion, it is selected. It is possible to use only the first criterion or only the first two criteria. It is also possible to provide for other criteria if 3 are not enough to select only two of the three maximum salience areas.

At the next step, S4, the window bounding the two selected maximum salience areas is determined in the saliency map. This window is preferably the smallest rectangle having two sides parallel to the x axis and two sides parallel to the y axis and bounding both selected areas. The source image pixels for which the corresponding points in the saliency map belong to this bounding window are thus considered, according to the invention as belonging to a layout area in the source image.

According to a variant of this embodiment, q maximum salience points are sought and q maximum salience areas are defined at step S'2, q being greater than 3. This number of maximum salience areas is then limited to 2 by applying the predefined criteria to all the areas area pairs possible.

Likewise, the number n of search areas may be increased, the number q of maximum salience areas defined being then at least equal to n+1.

According to an improvement applicable to the two embodiments, the automatic layout area detection method comprises a binarisation step for the saliency map before determining the bounding window (step S4 or S'3). During this step, the salience value of points in the three maximum salience areas (first embodiment) or of the two maximum salience areas of each search area (second embodiment) is set to 255 (or to the maximum salience value) and the salience value of the other points is set to zero. This purpose of this binarisation step is to facilitate the bounding window determination step.

According to another improvement also applicable to the two embodiments, the automatic layout area detection method comprises a step for checking temporal consistency of the maximum salience areas defined in step S4 or S'3. This step consists in verifying, for each point of the maximum salience area, if it belongs to such an area in the preceding image or images. This step can be implemented using counters. A counter is provided for each search area point for example. The counter is incremented each time that the point considered belongs to a maximum salience area in a given image. Thus, if the point under consideration belongs to a maximum salience area in the current image belonging also to a maximum salience area in the preceding image(s), this point is maintained as being part of a maximum salience area. The purpose of this step is to reinforce the choice of maximum salience areas defined in the current image.

The invention also relates to an image processing method able to generate a predefined reduced size image, from a source image, intended to be displayed on a reduced size screen. An automatic reframing method is also discussed. Such a method traditionally comprises a step of generation of a source image saliency map and a step of generation of a reduced size image from a source image using the saliency map. The reduced size image generated being the sub-image or part of the source image with the most perceptual interest for the viewer. The reduced size image generation step comprises more specifically defining, in a source image a framing window, which is smaller than the source image containing the most salient points of the image or the greatest number of salient points. The reduced size image generated is thus the image contained in the framing window. In this traditional method, the layout areas present a problem in determining the size and position of the framing window because, as salient parts of the image, they affect the framing although they are not of interest for the viewer.

According to the invention, the automatic reframing method comprises a step of detection of layout areas in the source image in compliance with the automatic layout detection method previously described, these layout areas being then taken into account during the reduced size image generation step. The saliency map generation step for the automatic reframing method is advantageously that of the automatic layout area detection method.

According to a first embodiment of the automatic reframing method, the salience values of the points contained in the bounding window(s) determined by the layout area detection method are set to zero. The salience areas produced by the layout areas of the source image are withdrawn or deleted in the saliency map. The saliency map is thus "cleaned". The size and position of the framing window is then calculated using this "cleaned" saliency map. The automatic determination of the framing window is no longer contaminated by the saliency of layout areas of the source image.

According to a second embodiment of the automatic reframing method, the bounding window(s) determined by the layout area detection method are considered as being prohibited areas. In this embodiment, the framing window is then determined in such a way as to not comprise pixels corresponding to points that belong to a prohibited area. The reduced size image does not therefore comprise any layout areas detected by the automatic detection method of the invention.

A third embodiment consists in combining these two embodiments, in that the saliency map used to determine the position and size of the framing window is not only cleaned but, in addition, the automatic framing window is determined to not contain pixels corresponding to pixels belonging to layout areas.

Figure 4A:
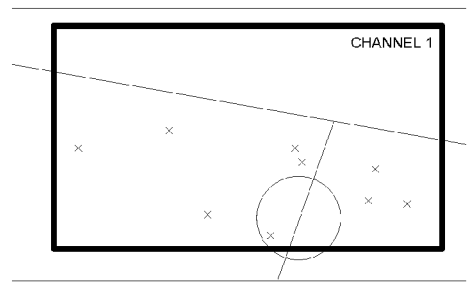
FIG. 4A shows the generation of a reduced size image from a source image according to a known method, and FIG. 4B, to be compared with FIG. 4A, shows the generation of a reduced size image from the same source image according to the method of the invention.
Figure 4B:
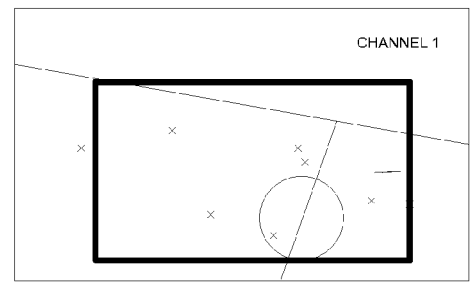

FIG. 4B shows the automatic reframing window determined by the method of the invention (third embodiment) to be compared with FIG. 4A showing the automatic reframing window determined by a standard method in the case of an image showing a scene from a football match. The processed source image shows more particularly players on the football pitch in the lower and middle parts and spectators installed in the stands in the upper part. The match time and score are displayed in the upper left-hand corner of the image and a logo is displayed in the upper right-hand corner of the image. When a standard automatic reframing method is applied to this image (FIG. 4A), a framing window (white rectangle in the figure) is obtained bounding both the players and the layout areas (that is the match time, the score and the logo). When the method of the invention is applied, the layout areas are excluded from the window. The window is positioned and dimensioned so as to only comprise the players.

Although the invention has been described in relation to various specific embodiments, it is clearly understood that it is not limited to these, and that it comprises all technical equivalents of the means described as well as their combinations if these fall within the scope of the invention.

The invention claimed is:

1. Automatic detection method of detecting at least one area called a layout area in a source image, comprising at least one layout, wherein said method comprises:
   generating a saliency map of said image source using a visual attention model, said saliency map associating with each pixel of the source image a salience point having a salience value, and
   determining, from said saliency map, said at least one layout area in the source image,
   wherein said determining comprises:
      searching for within at least one predefined area of the saliency map known as the search area, two points having the same or nearly the same salience value as the maximum salience value of said saliency map and which are distant by at least p points, and defining, for each of the two points of maximum salience, a maximum salience area, bounding the maximum salience point, and
      defining a window for each search area comprising two maximum salience areas, called a bounding window, bounding said two maximum salience areas, said bounding window thus defined in the saliency map corresponding to a layout area in the source image.

2. Method according to claim 1, in which said at least one search area comprises at least one saliency map area of a predefined size, corresponding to a source image area located in a corner of the source image.

3. Method according to claim 2, in which said at least one search area comprises m areas of predefined size of the saliency map; each corresponding to said source image area located in the corner of the source image with m being comprised between 2 and 4.

4. Method according to claim 1, in which said searching for within the at least one predefined area comprises:

searching in n predefined search areas of the saliency map, q points having an equal or nearly equal salience value to the maximum salience value of said saliency map and at a distance of at least p points from each other, and defining a maximum salience area for each of the q maximum salience points, an area, said maximum salience, bounding the maximum salience point, n being greater than or equal to 2 and q being greater than n+1, and selecting two maximum salience areas, from among the q maximum salience areas, confirming at least one predefined criterion.

5. Method according to claim 4, in which n is equal to 2 leading to two search areas and q is equal to 3, and in which the two search areas are areas in the saliency map corresponding to two bands of a predefined width in the upper part and lower part of the source image.

6. Method according to claim 4, in which the two maximum salience areas selected will verify at least one of the following criteria:

that the height of the smallest rectangle containing the two maximum salience areas is less than a maximum height, that the surface area of the smallest rectangle containing the two maximum salience areas is less than a maximum surface area, that the distance between the centre of the saliency map and each of the two maximum salience areas is greater than a minimum distance.

7. Method according to claim 1, in which the maximum salience area defined for a maximum salience point is a circle, of predefined radius, centered on said maximum salience point.

8. A method for processing a source image able to generate a reduced size image from said source image, wherein the method comprises:

automatic detection of layout areas by:

generating a saliency map of said image source using a visual attention model, said saliency map associating with each pixel of the source image a salience point having a salience value, and determining, from said saliency map, said at least one layout area in the source image, wherein said determining comprises:

searching for within at least one predefined area of the saliency map known as the search area, two points having the same or nearly the same salience value as the maximum salience value of said saliency map and which are distant by at least p points, and defining, for each of the two points of maximum salience, a maximum salience area, bounding the maximum salience point, and defining a window for each search area comprising two maximum salience areas, called a bounding window, bounding said two maximum salience areas, said bounding window thus defined in the saliency map corresponding to a layout area in the source image; and generation of a reduced size image from said source image based on the saliency map generated for the automatic detection of a layout area, and on the detected layout area.

9. Method according to claim 8, in which the points contained in the bounding window determined by the automatic layout area detection method are set to zero in the saliency map used to generate a reduced size image.

10. Method according to claim 8, in which the reduced size image is generated in such a way as to exclude pixels corresponding to points contained within the bounding window determined using the automatic layout area detection method.

* * * * *